(12) United States Patent
Miyazawa

(10) Patent No.: US 7,301,744 B2
(45) Date of Patent: Nov. 27, 2007

(54) ELECTRONIC EQUIPMENT, DRIVING METHOD THEREOF AND METHOD OF DRIVING ELECTRONIC CIRCUIT

(75) Inventor: Takashi Miyazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 883 days.

(21) Appl. No.: 10/417,189

(22) Filed: Apr. 17, 2003

(65) Prior Publication Data

US 2004/0080882 A1  Apr. 29, 2004

(30) Foreign Application Priority Data

Apr. 23, 2002 (JP) ............................. 2002-121288
Apr. 11, 2003 (JP) ............................. 2003-107936

(51) Int. Cl.
*H02H 9/00* (2006.01)
(52) U.S. Cl. ..................................................... 361/100
(58) Field of Classification Search ................. 361/100
See application file for complete search history.

(56) References Cited

U.S. PATENT DOCUMENTS

| 5,903,246 A | 5/1999 | Dingwall |
| 5,952,789 A | 9/1999 | Stewart et al. |
| 6,229,506 B1 | 5/2001 | Dawson et al. |
| 6,307,322 B1 | 10/2001 | Dawson et al. |
| 6,885,029 B2 * | 4/2005 | Miyazawa ............. 257/59 |

FOREIGN PATENT DOCUMENTS

JP  A-8-305832  11/1996

OTHER PUBLICATIONS

Taboury et al., "Right-handed and left-handed helioes of poly(dA-dC).(dG-dT)", *Nucleic Acids Research*, vol. 13, No. 12, 1985, pp. 4469-4483.

Maeda et al., "$Mg^{2+}$-Selective Electrode Comprising Double-Helical DNA as Receptive Entity", *Chemistry Letters*, 1994, pp. 1805-1808.

\* cited by examiner

*Primary Examiner*—Stephen W. Jackson
(74) *Attorney, Agent, or Firm*—Oliff & Berridge, PLC

(57) ABSTRACT

In order to compensate fluctuation of the characteristics of a field effect transistor and detect capacitive change of a capacitive element for measurement with high precision, the electronic circuit of the present invention includes; a transistor outputting current in response to voltage change, which is supplied from a variable voltage source to a current control terminal by capacitive coupling via the capacitive element for measurement; and the constant current source to output reference current; and the current detection circuit to detect output current outputted from the transistor. After making the reference current pass through the transistor and compensating fluctuation of threshold voltage, a switching element is turned "OFF" so as to make the current path between the gate and the drain of the transistor to be non conductive. The voltage applied to the gate electrode from the variable voltage source via the capacitive element for measurement is changed thereby and output current level is detected by the current detection circuit so as to obtain the changed amount of the capacity of the capacitive element for measuring.

31 Claims, 12 Drawing Sheets

ELECTRONIC EQUIPMENT, DRIVING METHOD THEREOF AND METHOD OF DRIVING ELECTRONIC CIRCUIT

BACKGROUND OF THE INVENTION

1. Field of Invention

The present invention relates to an electronic circuit and electronic equipment, which are suitable for high sensitivity detection of capacity.

2. Description of Related Art

Personal identification by fingerprint matching plays an important role, not only for criminal investigation, but also as a simple and reliable means for prevention of crime and improvement of safety. Japanese Patent Laid-Open No. 8-305832 suggests a finger print sensor for obtaining finger print image pattern electrically, by using the electrostatic capacity value formed between a finger-tip and an electrode, that varies depending on unevenness of fingerprint.

In recent years, made-to-order medical care using bioinformatic technology is proposed in the field of medical science. Demand of a biochip, which can check a lot of samples to be examined with high speed, is increasing as a key technique of bioinformatic technology.

In the above mentioned finger print sensor and biochip, a transistor should be provided with a detection portion in the detection device, in order to implement processing with high speed. However, a transistor, a thin film transistor (TFT) in particular, has large fluctuation of its characteristics, such that it is difficult to implement precise detection. In addition, it is difficult to detect a microscopic amount of capacity.

SUMMARY OF THE INVENTION

Thus, the present invention is directed to a technology with a detecting capacity with precision and/or high sensitivity.

Therefore, according to a first aspect of the present invention, a method to drive an electronic circuit providing a transistor and a first capacitive element includes electrically connecting a first terminal of the transistor to a current control terminal of the transistor; disconnecting the electrical connection between the first terminal and the current control terminal; and changing voltage applied to the current control terminal by supplying voltage signal to the fist capacitive element.

Hence, the method can compensate fluctuation of transistor's characteristics, such as threshold voltage and others, while it can set the current control terminal of a transistor to a desirable voltage value.

In the third step, capacitive coupling can be used as a method of changing voltage applied to the current control terminal, for example. Namely, a voltage signal is supplied to an electrode located opposite to the other electrode of the current control terminal with the first capacitive element, so as to change voltage at the current control terminal.

In the third step, the voltage signal may be outputted by a voltage supplying unit and the value of the voltage signal may be adjusted to adjust the gain of current level or an amount of current flowing between the first terminal and the second terminal of the transistor. The sensor sensitivity, the signal-to-noise ratio can be adjusted within an appropriate range thereby.

Here, "an electronic circuit", means a circuit to sense, for example, such as a sensor cell, which will be explained in detail in the present exemplary embodiment. In addition, "a device that supplies a voltage signal" refers to a device that supplies voltage and may be able to output at least two voltage levels in order to adjust the gain. Of course it may be a variable voltage source. It may include a device to switch and output a plurality of power source outputs having different output voltage levels. In addition, "a current control terminal" refers to a terminal to control the conductive state of a transistor, such as a gate terminal in case of a field effect transistor. In addition, "the first terminal" and "the second terminal" refers to a current input terminal or a current output terminal in a transistor having three terminals, such as a source terminal or a drain terminal in a field effect transistor. Matching the first terminal or the second terminal to a source terminal or a drain terminal is determined by the relative potential difference between the both terminals and the conductivity type of a transistor.

For example, in case of a P type transistor, a terminal having higher potential between the first terminal and the second terminal becomes a source. In case of a N type transistor, a terminal having lower potential becomes a source.

In addition, "a capacitive element" refers to a structure including not only two electrodes, but constituting capacity with a material, an object and electrodes. Voltage applied to the first capacitive element can also be applied to the current control terminal via coupling, adjusting the amplification rate of a transistor to an appropriate range and improving the sensitivity as a sensor and/or the S/N ratio.

In one exemplary embodiment, the electronic circuit may include a second capacitive element, where one electrode is connected to the current control terminal and the other electrode is connected to a constant voltage source. The capacity value of the second capacitive element is made constant so as to utilize it as a reference capacitor.

In the above-mentioned electronic circuit, one electrode of the second capacitive element may be connected to the current control terminal and the other terminal may be connected to a finger or a sample to be examined.

In one exemplary embodiment, in the first step, current may be made to flow between the first terminal and the second terminal.

According to the method to drive the above mentioned electronic circuit, the first step makes current flow between the first terminal and the second terminal of the transistor, so as to set voltage of the current control terminal to a voltage range where the threshold voltage of the transistor is added.

In one exemplary embodiment, in the first step, the switching element installed on the current path between the first terminal and the current control terminal is placed in an open state, so as to connect the first terminal to the current control terminal, while in the second step, the switching element is placed in an open state, so as to separate the first terminal from the current control terminal. When capacitive coupling is implemented in the third step, the current control terminal may be made a perfect floating state, especially in the second step.

In the above-mentioned method to drive the electronic circuit, interposing the switching element between the first terminal and the current control terminal enables connection between the both to be switch-controlled.

In the above-mentioned method to drive the electronic circuit, the capacitance value of the first capacitive element may be changed by maintaining a substance.

According to this structure, the existence or non-existence of a substance can be detected by measuring the capacitance value of the first capacitive element.

In one exemplary embodiment the first capacitive element includes an acceptor to hold the substance. According to this structure, an acceptor, which reacts to a substance specifically, is fixed so as to detect such substance with high sensitivity. Hence, a biochip or a biosensor with high sensitivity can be constituted thereby.

Here, "an acceptor" can appropriately be selected depending on a substance, which should be detected. Therefore, it may have the molecular recognition reaction that uses an interaction such as a hydrogen bond or intercalation, an enzyme, an antigen or an antibody, which shows specific properties in a substrate. It may also be fixed to the surface of a electrode of a capacitive element.

In the above-mentioned method to drive the electronic circuit, the substance may be an organic compound. The substance may be a protein or a nucleic acid.

In addition, in the above-mentioned method to drive the electronic circuit, the first capacitive element or the second capacitive element may include a material or a substance and an electrode connecting the current control terminal of the first capacitive element or the second capacitive element. The substance in one exemplary embodiment is located sufficiently adjacent to the electrode to form a capacitance. According to this structure, it can be used as a sensor to detect the configuration of a substance, such as a finger and others, for example.

Further, according to a second aspect of the present invention, a method to drive a electronic circuit, which detects capacitance generated between a sample to be examined and at least one electrode to detect capacitance includes: compensating characteristics of a transistor by connecting a current control terminal and a drain of the transistor to which the current control terminal is connected to one of electrode to detect capacitance among at least one electrode to detect capacitance; and making current, having a current level in response to the voltage value of the current control terminal pass through the transistor, when an amount of current passing through the electronic circuit is measured.

In the method to drive the electronic circuit, the voltage value of the current control terminal may be set by capacitive coupling via the capacitive element for reference connected to the current control terminal so as to adjust the current level.

Otherwise, in the method to drive the electronic circuit, the voltage value of the current control terminal may be set by capacitive coupling via the capacitive element, which is constituted by the sample to be tested and at least one of the electrodes that detect capacity, so as to adjust the current level.

According to a third aspect of the present invention, a method to drive a electronic circuit detecting capacitance produced between a sample to be tested and at least one electrode to detect capacitance includes: connecting a first current control terminal and a first drain of a first transistor, to which the first current control terminal is connected to one of electrodes to detect capacitance among the at least one of electrodes to detect capacitance; compensating characteristics of a second transistor, of which a second current control terminal is connected to the one electrode to detect capacitance by the connection between the first current control terminal and the first drain of the first transistor; and making current, having a current level in response to the voltage value of the second current control terminal, pass through the second transistor, when an amount of current passing through the electronic circuit is measured.

In the above mentioned method to drive the electronic circuit, the voltage value of the second current control terminal may be set by capacitive coupling via the capacitive element for reference, connected to the second current control terminal so as to adjust the current level. Otherwise, in the method to drive the electronic circuit, the voltage value of the second current control terminal may be set by capacitive coupling via the capacitive element, which is constituted by the sample to be tested and the at least one of the electrode to detect capacity, so as to adjust the current level.

According to a fourth aspect of the present invention, a method to drive a electronic circuit detecting capacitance, produced between a sample to be tested and at least one electrode to detect capacitance includes: making current, having a current level in response to the voltage value of a current control terminal pass through a transistor to which the current control terminal is connected, to one electrode to detect capacitance among the at least one electrodes to detect capacitance, when an amount of current passing through the electronic circuit is measured; setting the voltage value of the second current control terminal by capacitive coupling via the capacitive element for reference, connected to the current control terminal, so as to adjust the current level.

According to a fifth aspect of the present invention, a method to drive a electronic circuit detecting capacitance produced between a sample to be tested and at least one electrode to detect capacitance includes; making current, having a current level in response to the voltage value of a current control terminal pass through a transistor to which the current control terminal is connected to one electrode to detect capacitance among the at least one electrode to detect capacitance, when an amount of current passing through the electronic circuit is measured; setting the voltage value of the second current control terminal by capacitive coupling via the capacitive element, which is constituted by the sample to be tested and the at least one electrode to detect capacity, so as to adjust the current level.

In addition, according to another aspect of the present invention, a method to drive electronic equipment, which includes a first transistor and a capacitive element connected to a current control terminal of the first transistor, includes: a compensation step of compensating fluctuation of characteristics of the first transistor; and a measurement step of measuring an amount of current that flows between a first source and a first drain of the first transistor, under a state where the conductive state of the first transistor is set to be a conductive state, which is in response to electric charge accumulated in the capacitive element.

Hence, current can be detected after compensating fluctuation of characteristics, such as threshold and others, of the transistor of which the current flows, such that an amount of the current can be detected with high precision. Here, an example of "electronic equipment" is a detection apparatus provided with a detecting circuit to sense, for example, a biosensor and a finger print sensor, described in detail in the present exemplary embodiment.

In the above-mentioned method to drive the electronic equipment, the compensation step may be implemented under a state where the first drain is electrically connected to the first current control terminal of the first transistor.

In the above-mentioned method to drive the electronic circuit, the compensation step may be implemented under a state where the second drain is electrically connected to the second current control terminal of the first transistor. In detail, an example of a current mirror circuit, described below and shown in FIG. 14, is cited as the above connection for example.

In the above mentioned method to drive the electronic equipment, when implementing the measurement step, or before implementing the measurement step, a voltage signal is supplied to the capacitive element and the voltage value of the first current control terminal is changed by the capacitive coupling, such that an amount of current, which flows between the first source and the first drain, is adjusted.

In addition, according to another aspect of the present invention, a method to drive a electronic equipment, which includes a first capacitive element, where one electrode is connected to a current control terminal of a first transistor and the other electrode is connected to a voltage supply means, includes a measurement step of measuring an amount of current that passes through the transistor, the value of output voltage outputted from the voltage supply device being changed when implementing the measurement step or before implementing the measurement step, so as to change voltage of the current control terminal.

Hence, the current gain of the transistor can be adjusted, such that measurement with high sensitivity can be attained.

In the above-mentioned method to drive the electronic equipment, a plurality of voltage values of the current control terminal may be set by a plurality of output voltages and the amount of current may be measured under each of conditions. Hence, the capacity value can be calculated thereby. If current passing through the transistor regarding more amounts of output voltages is measured, it is possible to calculate the capacity value with high precision.

In addition, according to another aspect of the present invention, the electronic equipment includes a transistor of which a current control terminal is connected to at least one electrode among electrodes constituting a capacitive element; a current detection circuit to measure current that passes through the transistor; and a compensation device to compensate for fluctuation of the characteristics of the transistor. The above mentioned electronic equipment is provided with a compensation device to compensate for fluctuation of the characteristics of a transistor, such as threshold voltage value, gain coefficient and others so as to detect current precisely.

The above-mentioned electronic equipment may be provided with a voltage signal supply device that outputs a voltage signal in order to adjust voltage at the current control terminal via the capacitive element.

Hence, the gain of output current can be adjusted so as to set an appropriate range of sensor sensitivity or S/N ratio.

According to other aspect of the present invention, a method to drive electronic equipment includes a transistor of which a current control terminal is connected to at least one electrode among electrodes constituting a capacitive element; a current detection circuit to measure current that passes through the transistor; and a voltage signal supply device that outputs a voltage signal in order to adjust voltage at the current control terminal via the capacitive element.

Hence, the gain of output current can be adjusted so as to set an appropriate range of sensor sensitivity or S/N ratio.

The above mentioned electronic equipment may be provided with a compensation device to compensate for fluctuation of the characteristics of a transistor, such as threshold voltage value, gain coefficient and others so as to detect current precisely.

In the above-mentioned electronic equipment, the compensation device may be an electronic circuit including the transistor. Such compensation may be implemented under a state where the drain of the transistor is electrically connected to the current control terminal described later, or a transistor forming a mirror toward the transistor or an electrode having the same capacitance is connected to the drain of the transistor electrically connected to the current control terminal and the current control terminal.

DETAILED DESCRIPTION OF PREFERRED EMBODIMENTS

Preferred exemplary embodiments of the invention are described referring to drawings thereafter.

First Exemplary Embodiment of the Present Invention

Figure 1:
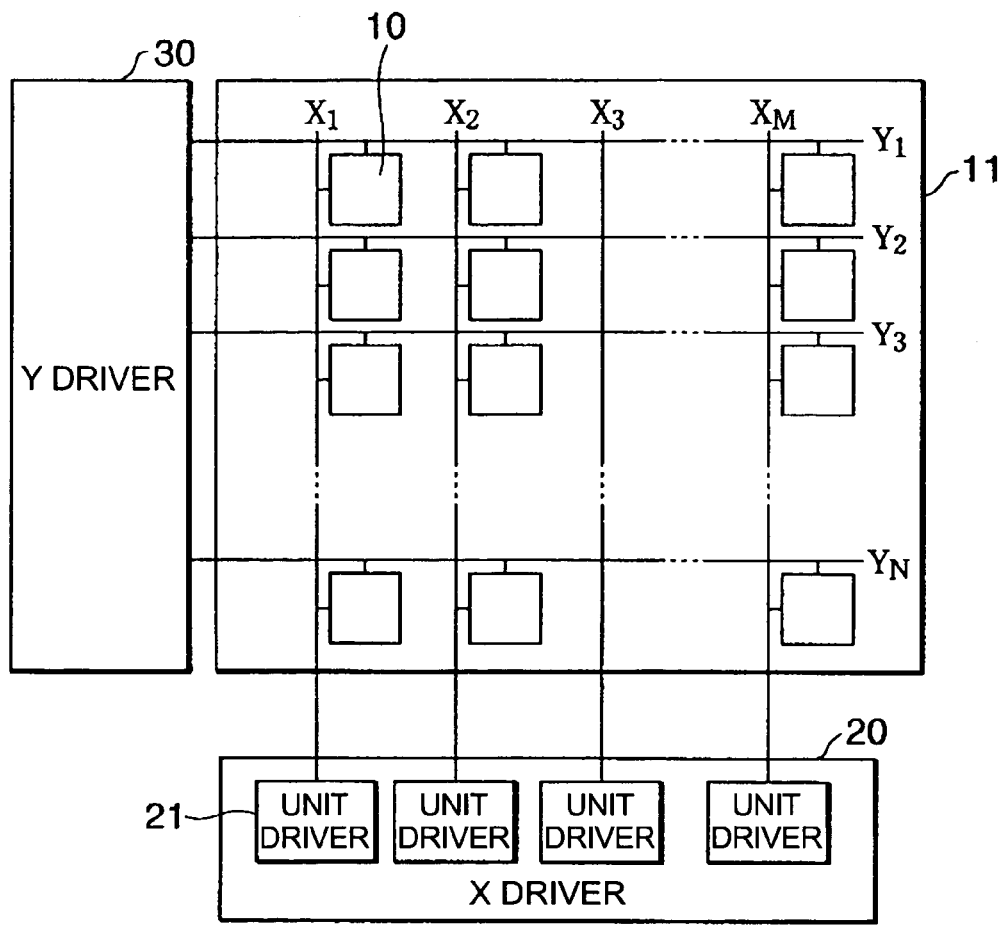
FIG. 1 is a circuit schematic of a biosensor of the present invention.

FIG. 1 is a block schematic of a biosensor regarding the present exemplary embodiment. The sensor includes a plurality of sensor cells 10 formed on a substrate 11 by using semiconductor process, a X driver 20 to detect biochemical reaction in the sensor cell 10 as a changed amount of current level, a Y driver 30 switch to control a FET that is composed of the censor cell 10. The sensor cell 10 is a capacitive type sensor where its capacity is changed by a biochemical reaction, and multi-sensor arrays are composed by matrix of N rows with M columns. M pieces of data lines X1, X2, . . . XM from a X driver 20 connected to each of the cells 10 respectively are formed on the substrate 11, while N pieces of scanning lines Y1, Y2, . . . YN from a Y driver 30 connected to each of the cells 10 respectively are formed on the substrate 11. Each of data lines Xm ($1 \leq m \leq M$) is controlled by a unit driver 21.

Figure 3:
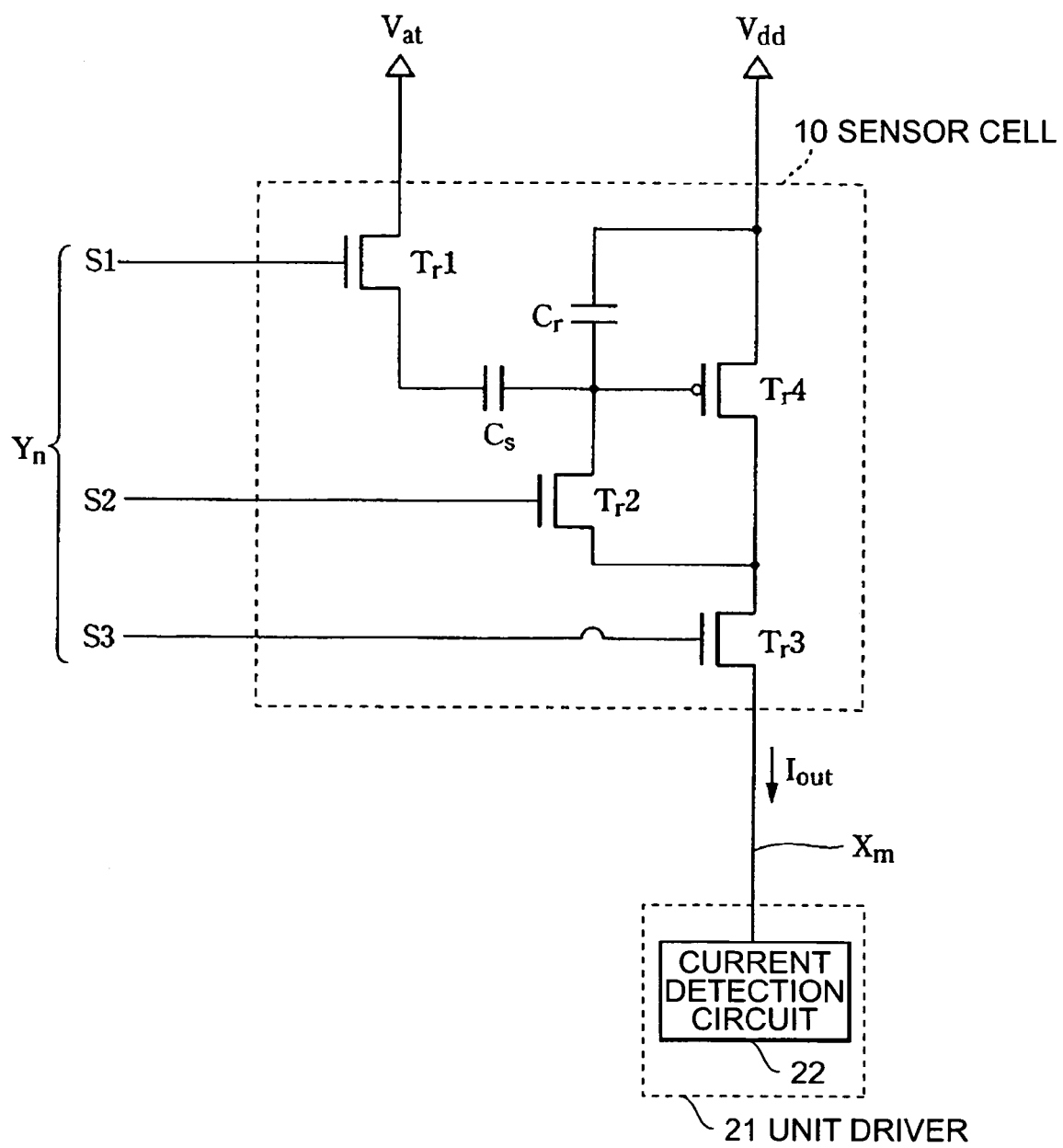
FIG. 3 is a circuit schematic of a sensor cell of the first exemplary embodiment.

FIG. 3 is a circuit and structural schematic of the sensor cells 10 arranged at the location of N rows with M columns ($1 \leq n \leq N$, $1 \leq m \leq M$) on the substrate 11 and the unit driver 21 connected to the sensor cells 10. Each of the sensor cells 10 includes a capacitor Cs that changes its capacitance depending on biochemical reaction, switching transistors Tr1 to Tr3, a transistor Tr4 for sensing that detects capacitive change of the capacitor Cs and a reference capacitor Cr that holds a constant capacitive value. The scanning line YN includes sub-scanning lines S1 to S3. The unit driver 21 is provided with a current detecting circuit 22 that detects the value of output current Iout, outputted from the sensor cell 10 via the data line Xm.

In the above mentioned structure, each of the scanning lines S1 to S3 is connected to the gate terminal of switching transistors Tr1 to Tr3 and controls ON/OFF of the switching transistors Tr1 to Tr3 in response to H level/L level of signals outputted from the Y driver 30. The switching transistors Tr1 to Tr3 include n channel-type FET and turned the "ON" state by H level signal. The switching transistor Tr1 is a switching element supplying voltage to the capacitor Cs from a variable voltage source Vat, where one end is connected to the variable voltage source Vat, while the other end is connected to the capacitor Cs. The switching transistors Tr2 and Tr3 are switching elements turned to be in the "ON" state by a H level signal from the sub scanning lines S2 and S3. One end of the switching transistor Tr2 is connected to the capacitor Cs, the reference electrode Cr and the gate terminal of the transistor Tr4, and the other end is connected to the drain terminal of the switching transistor Tr3.

The switching transistor Tr3 is a switching element that is turned to an "ON" state by a H level signal from the sub scanning line S3 and outputs drain current flowing channel of the transistor Tr4 to the data line Xm as output current I out, to the data line Xm. One end of the above transistor is connected to the drain terminal of transistor Tr4, while the other end is connected to a current detecting circuit 22 via the data line Xm. The transistor Tr4 includes a p channel-type FET and its source terminal is connected to a constant voltage source Vdd. In addition, the gate terminal of the transistor Tr4 is connected to the reference capacitor. An electrode of the reference capacitor, which is located oppositely to the gate terminal of the transistor Tr4, is connected to the constant voltage source Vdd. The output voltage value of the constant voltage source Vdd is set to a necessary and sufficient bias voltage, in order to activate the transistor Tr4 within a pinch off area. The gate voltage of the transistor Tr4 is determined by the value obtained by dividing the voltage, supplied from the variable voltage source Vat, with the capacitor Cs and the capacitor Cr, in a manner of supporting such that the capacitive change of the capacitor Cs caused by biochemical reaction can be detected as the change of mutual conductance of the transistor Tr5, namely, the change of its drain current.

Figure 2:
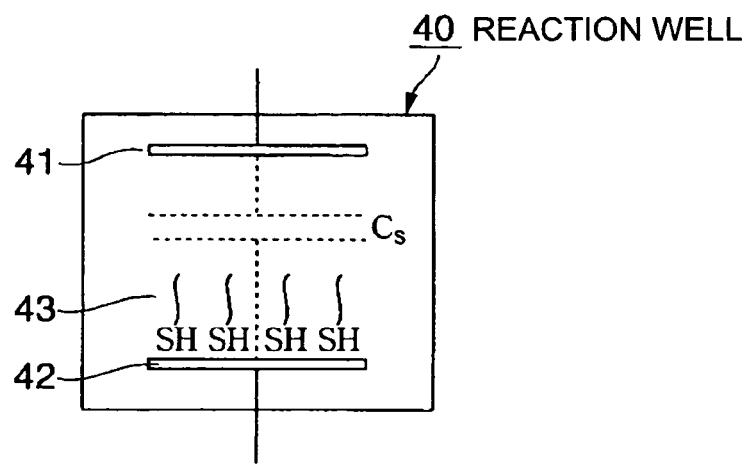
FIG. 2 is an explanatory schematic of reaction well detecting DNA hybridization.

FIG. 2 is an explanatory schematic of the capacitor Cs. As shown in the figure above, the capacitor includes a static capacity formed between a pair of electrodes 41 and 42 formed in a reaction well 40. The reaction well 40 is a micro well, which is formed in every sensor cell 10 by etching the substrate 11 to a concave shape, and maintains capacity where a predetermined quantity of sample solution, including a DNA piece needed for gene analysis, is filled. As a DNA piece for sample, a thing, which is obtained by disassembling DNA chains extracted from biological material with a gene splitting enzyme or supersonic treatment, or a single chain of DNA, which is amplified from specific DNA chains by PCR (polymerize chain reaction), can be used. An electrode 42 is made of gold and connected to a thiol group introduced to the end of DNA in a probe 43 via gold-sulfur coordinate bond. A method of introducing a thiol group to oligonucleotide is disclosed by Chemistry Letters 1805-1808 (1994) or Nucleic Acids Research, Vol. 13, pp. 4469-4483 (1985) in detail. If the base sequences of the probes 43 fixed in the adjacent sensor cell 10 are differentiated slightly from each other, hybridization can be detected with high precision.

As a DNA chain, which becomes the probe 43, a DNA chain obtained by cutting DNA chains extracted from a living body sample with a restriction enzyme and refining it with electrophoresis, or oligonucleotide, which is synthesized biochemically, can be used. It is desirable to determine the base sequence beforehand. When the DNA chain in a sample solution having the base sequence, which is complementary with the probe 43, is hybridized with the probe 43, the dielectric constant between a pair of electrodes 41 and 42 is changed so as to change the capacitance of the capacitor Cs. As described above, capacitance change of the capacitor Cs can be detected as change of drain current of the transistor Tr5.

Figure 4:
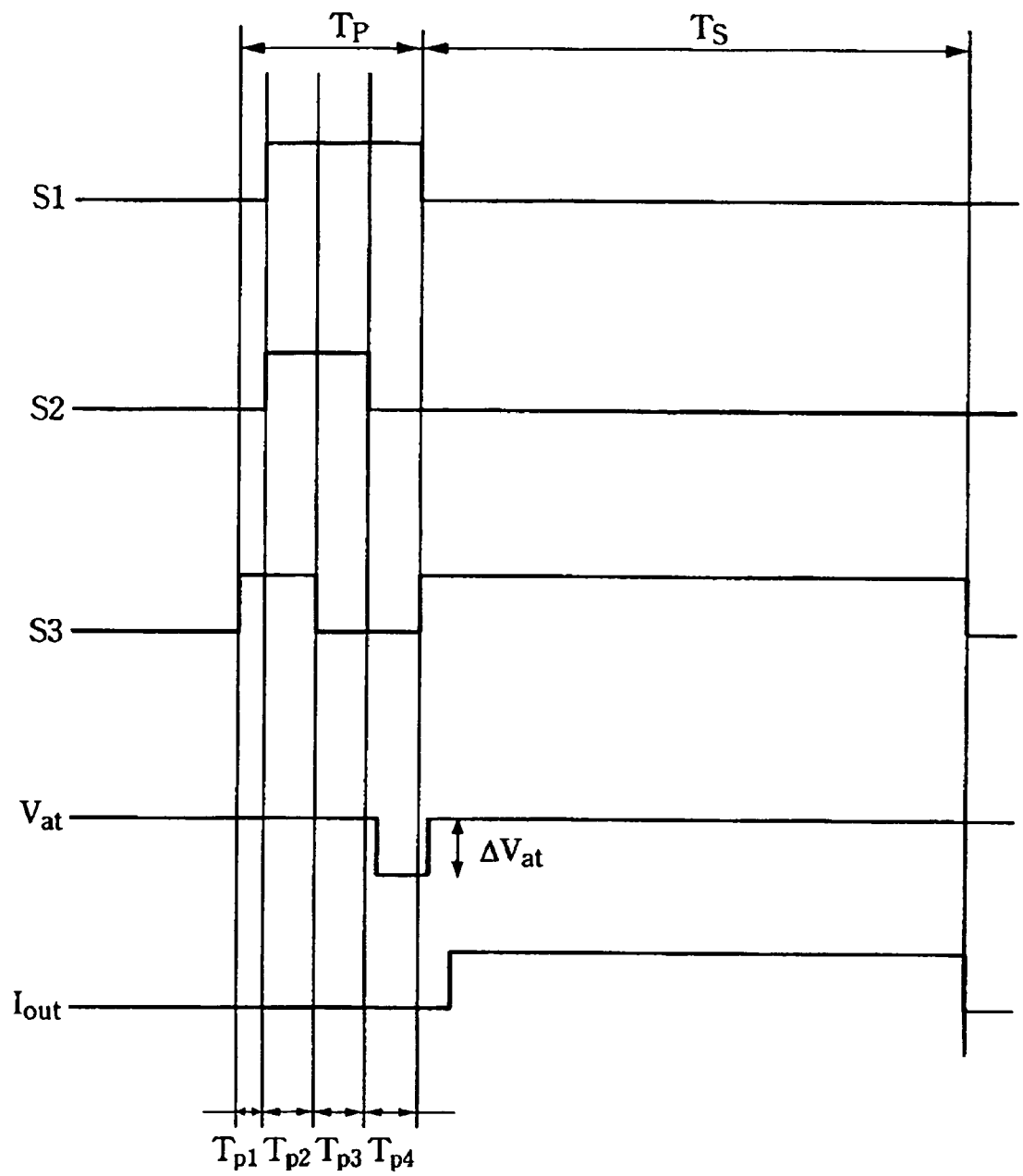
FIG. 4 is a timing chart of various control signals of a sensor cell of the first exemplary embodiment.
Figure 5:
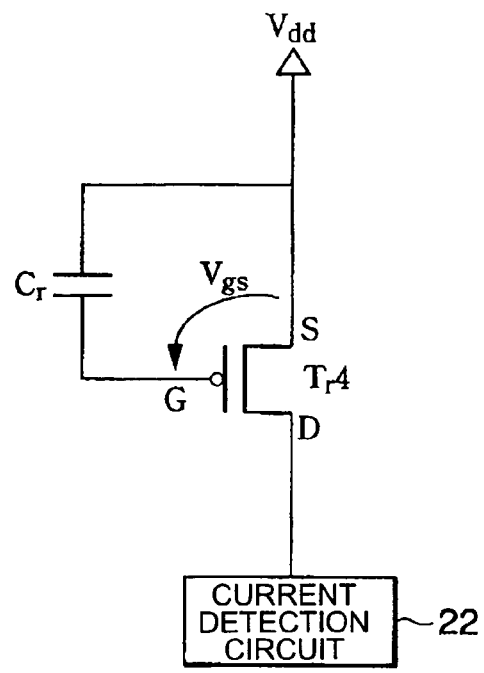
FIG. 5 is an equivalent circuit of the sensor cell.

FIG. 4 shows timing charts of various signals to drive a sensor cell. In this figure, Tp is a compensation stage when fluctuation of the threshold voltage of the transistor Tr4 is compensated and Ts is a sensing stage when output from the sensor is detected. The compensation stage Tp includes four-sub stages Tp1 to Tp4. In the sub stage Tp1, the sub scanning line S3 is raised to H level under the state when the sub scanning lines S1 and S2 are taken down to L level. FIG. 5 is an equivalent circuit schematic at this time. In this figure, the voltage Vgs between gate/source is biased to be negative so as to turn the transistor Tr4 "ON" state.

Figure 6:
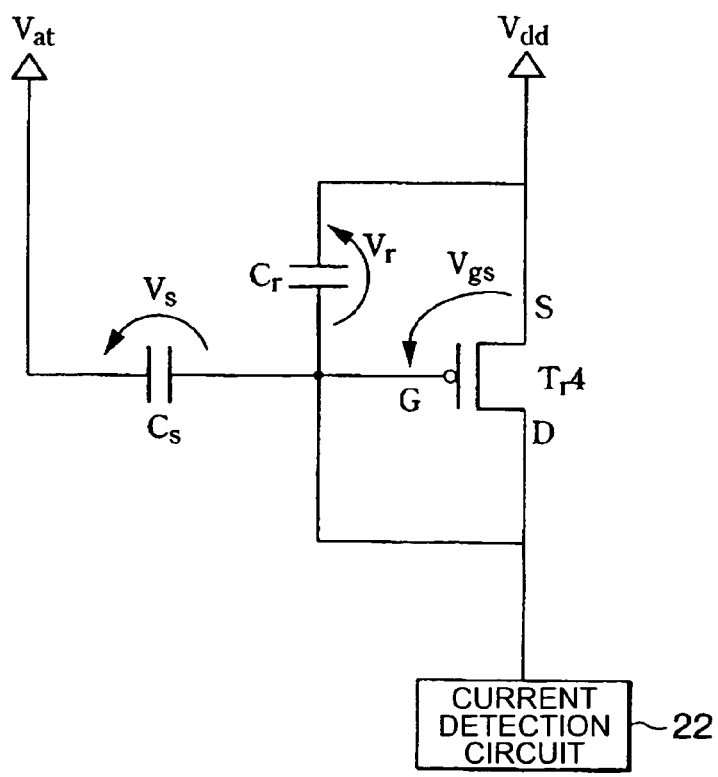
FIG. 6 is an equivalent circuit of the sensor cell.
Figure 7:
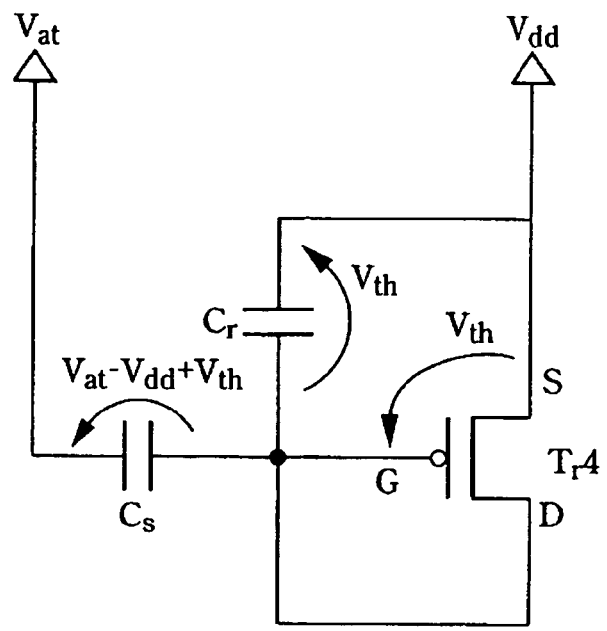
FIG. 7 is an equivalent circuit of the sensor cell.

When a stage is successively shifted to the sub stage Tp2, the scanning line S3 is maintained in H level, while the scanning lines S1 and S2 are raised from L level to H level. FIG. 6 is an equivalent circuit schematic at this time. When the directions of voltage Vr of the capacitor Cr and voltage Vs of the capacitor Cs are established, as shown in this figure, these voltages are Vr=Vgs, and Vs=Vat−Vdd+Vgs. When a stage is successively shifted to the sub stage Tp3, the scanning lines S1, and S2 are maintained to H level, while the sub scanning line S3 is taken down from H level to L level. FIG. 7 is a circuit schematic at this time. The switching transistor Tr3 is turned off, such that all drain current flowing through the channel of the transistor Tr4 is flown to the gate terminal. This makes voltage of the gate terminal rise. At the time when Vgs is equivalent to the threshold voltage Vth, the transistor Tr4 is turned "OFF". These voltage are Vr=Vth, Vs=Vat−Vdd+Vth at this time.

Figure 8:
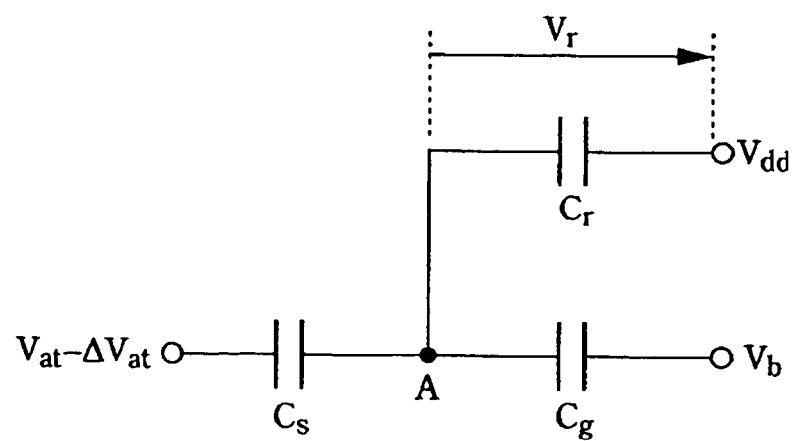
FIG. 8 is an equivalent circuit of the sensor cell.

When a stage is successively shifted to the sub stage Tp4, the sub scanning line S1 is maintained at H level, while the sub scanning line S3 is maintained at L level and the sub scanning line S2 is taken down from H level at L level. FIG. 8 is an equivalent circuit schematic at this time. In this figure, Cg means a MOS capacitor formed between a silicon substrate and the gate terminal of the transistor Tr4. Vb is a substrate bias voltage regarding the source terminal of the transistor, and the relationship of Vb=Vdd is satisfied. In other words, the reference capacitor Cr and the capacitor Cg are connected in parallel with each other and these integrated capacitances are (Cr+Cg). In addition, after making a point A in the schematic floating state electrically by taking the signal of the sub scanning line S2 down, the output voltage of variable voltage source Vat is changed by ΔVat with a little delay from the edge of taking the above signal down, so as to change the voltage Vr of the capacitor Cr, as in the following, by capacitive coupling;

$$Vr=-Cs\Delta Vat/(Cs+Cr+Cg)-Vth \tag{1}$$

Next, when a stage is successively shifted to the sensing stage, the sub scanning line S2 is maintained to L level, while the sub scanning line S1 is taken down from H level to L level and the sub scanning line S3 is raised from L level to H level. In addition, the output voltage of variable voltage source Vat, is returned to the original voltage Vat, with a little delay from the edge of raising the signal of the sub scanning line S3. The equivalent circuit at this time is the same of FIG. 5. The value of output current I out from the drain terminal of the transistor Tr4 to the current detecting circuit 22 can be expressed as the following;

$$I_{out} = \alpha(Vgs - Vth)^2 \quad (2)$$

Here, $\alpha = (W\mu Cox)/(2L)$, W is a channel width, L is a channel length, $\mu$ is mobility, and Cox is the capacity of a gate oxide film per unit area. When Vgs is erased in the equation (2) and $\beta = Cs/(Cs+Cr+Cg)$ since $Vr = -Vgs$, the following equation is provided.

$$I_{out} = \alpha\beta 2(\Delta Vat)^2 \quad (3)$$

As shown in equation (3), the output current Iout is not related to the threshold voltage Vth, but proportional to square of the amount of voltage change $\Delta Vat$ of variable voltage source Vat. In other words, the threshold voltage Vth of the transistor Tr4 is compensated by the voltage memorized in the reference capacitor Cr and the capacitor Cs. The output current I out flowing through the channel of the transistor is determined regardless of the size of threshold voltage Vth, enabling fluctuation of the characteristics of the transistor Tr4 to be compensated. Furthermore, the value of $\beta$ can be obtained from the equation (3) by measuring the value of the output current I out. Here, the value of Cs can be obtained from the value of $\beta$, if Cr and Cg are known, since $\beta = Cs/(Cs+Cr+Cg)$.

In addition, in the above-mentioned structure, the probe DNAs having the base sequences, which are slightly different, are located with high density in each of the sensor cells 10 arranged in a matrix. The output signal from each of the unit drivers 21 is taken to computer equipment and data is analyzed by digitizing the above output signal in the computer, enabling gene analysis to be implemented in real time. In general, hybridization occurs, even if base sequences do not completely agree, such that the target DNAs couple complementarily with some distribution in a plurality of the sensor cells 10. The base sequence of the target DNA, has homography (hereditary similarity) with the probe DNA fixed by the sensor cell 10 where the amount of change of output current is the largest. Technology of gene analysis by using a biosensor of the present exemplary embodiment can be applied to inspection for a genetic disease or identification in forensic medicine. In addition, the sensor cell 10 functions a capacitive sensor such that it can detect DNA hybridization in the reaction well with high sensitivity and is superior in real time nature of signal detection.

In the above exemplary embodiment, capacitive change of the capacitor Cs caused by DNA chain's hybridization is measured. However, the present invention is not limited to this. For example, the present invention can detect antigen antibody reaction when an antigen is an acceptor, and detect enzyme substrate reaction when an enzyme is an acceptor. In other words, depending on kinds of acceptors, the present invention can be classified into a enzymatic sensor, a immune sensor, a microbial sensor, a organellar sensor, a texture sensor, and a receptor sensor, which are selectively used according to a purpose. Hence, a biomolecule having molecular recognition action can be selected appropriately as an acceptor depending on the use of a biosensor, such that sensing of various kinds of biochemical materials can be implemented. Such biosensor can be applied to a point of care device and a heath care device used in a medical field or an individual.

In addition, regarding each of the cell arrays 10, one of electrodes of the capacitor Cs is connected to the gate terminal of the transistor Tr4 and the other electrode is exposed on the surface of the substrate 11. Electrostatic capacitance between these electrodes and a finger-tip of a examinee is referred to as a capacitor Cs and its capacitance change is obtained so as to utilize it as a finger print sensor. In addition, regarding all or a part of transistors Tr1 to Tr5, a FET can be replaced with a bipolar transistor or other switching elements.

Second Exemplary Embodiment of the Present Invention

In the above-mentioned first exemplary embodiment, a case was described when electric current is detected with high precision by compensating the threshold voltage of a transistor. Further the fluctuation of the characteristics of a transistor may be compensated by using the reference current in order to compensate other characteristics of a transistor, such as gain coefficient and others in addition to the threshold voltage of a transistor.

It is described concretely hereafter.

Figure 9:
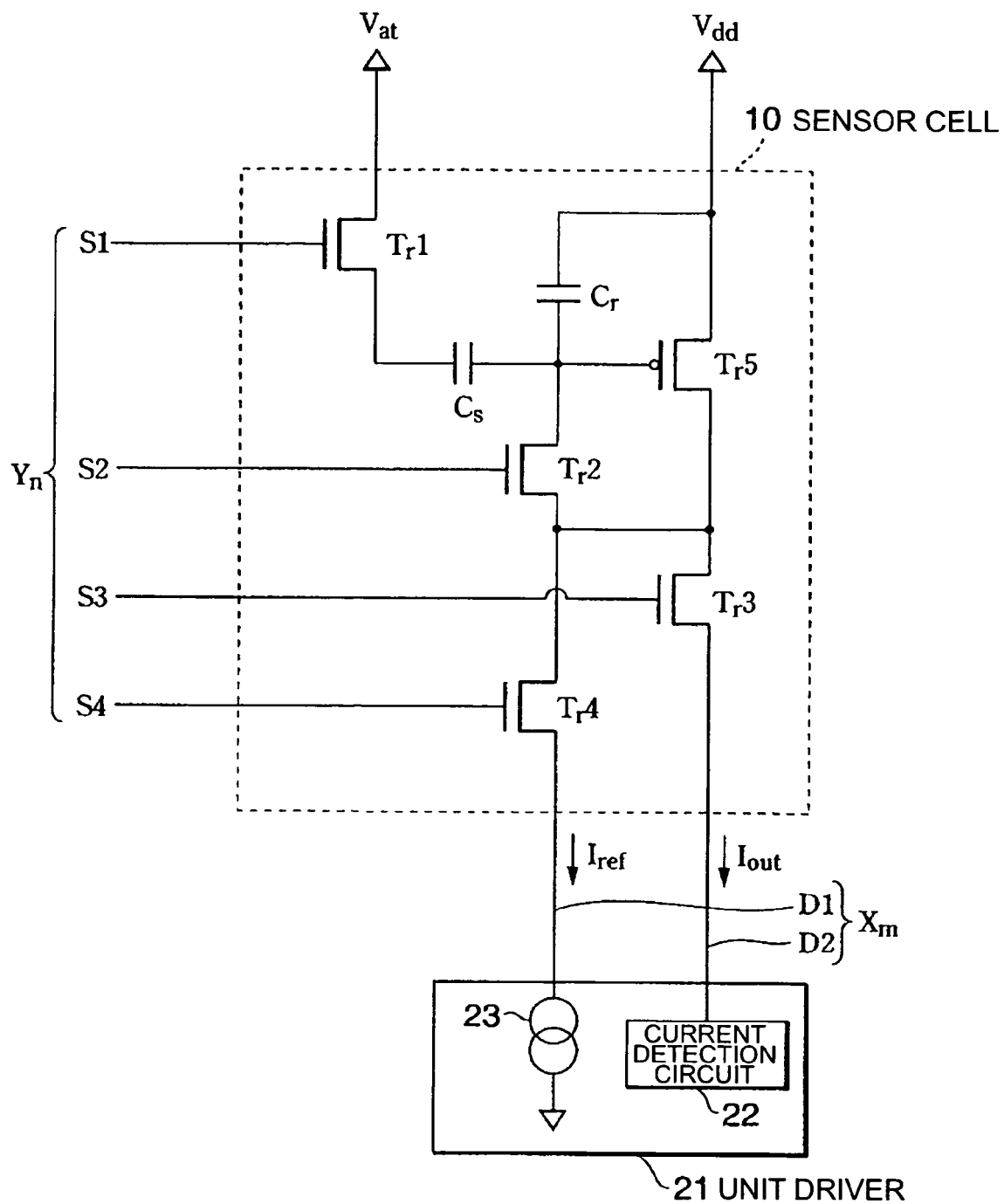
FIG. 9 is a circuit schematic of a sensor cell of the second exemplary embodiment.

FIG. 9 is a circuit structure schematic of the sensor cell 10 regarding the second exemplary embodiment. The Sensor cell 10 is a cell located at the position of n rows with m columns ($1 \leq n \leq N$, $1 \leq m \leq M$). The sensor cell 10 includes the capacitor Cs, which changes its capacity depending on biochemical reaction, switching transistors Tr1 to Tr4, a transistor Tr5 for sensing to detect the capacitive change of the capacitor Cs and the reference capacitor Cr. The data line Xm includes the sub data lines D1 and D2 and the scanning line YN include the sub scanning lines S1 to S4. The unit driver 21 is provided with a constant current supply 23 to supply reference current I ref to the sub data line D1, and the current detecting circuit 22 to detect the value of output current I out outputted from the sensor cell 10 via the sub data line D2.

In this structure, each of the sub scanning lines S1 to S4 is connected to the gate electrodes of the switching transistors Tr1 to Tr4 and controls turning the switching transistors Tr1 to Tr4 "ON" or "OFF" in response to H level or L level of signal outputted from the Y driver 30. The switching transistors Tr1 to Tr4 include n channel-type field effect transistors and are turned to an "ON" state by the H level signal. The switching transistor Tr1 is a switching element to supply voltage from variable voltage source Vat to capacitor Cs, in response to the signal from the sub scanning line S1, and its drain terminal is connected to the variable voltage source Vat, the source terminal is connected to the capacitor Cs. The switching transistor Tr2, and Tr4 are switching elements that are turned to an "ON" state by H level signal from the sub scanning lines S2 and S4 and make electric charge corresponding to the value of reference current I ref, supplied from the constant current supply 23 via the sub data line D1, stored into the reference capacitor Cr. The drain terminal of the switching transistor Tr2 is connected to the capacitor Cs, the reference electrode Cr and the gate terminal of the transistor Tr5, while its source terminal is connected to drain terminals of the switching transistors Tr4 and Tr3.

The switching transistor Tr3 is a switching element that is turned "ON" state by H level signal from the sub scanning line S3 and outputs drain current flowing through the channel of the transistor Tr5 to the sub data line D2 as output current I out. Its drain terminal is connected to the drain terminal of the transistor Tr5, while its source terminal is connected to the current detecting circuit 22 via the sub data line D2. The transistor Tr5 is composed of a p channel-type field effect transistor and its source terminal is connected to the constant voltage source Vdd. In addition, the gate terminal of the transistor Tr5 is connected to the reference capacitor Cr. The electrode located oppositely to the electrode of the reference capacitor Cr, which is connected to the gate terminal of transistor Tr5, is connected to the constant voltage source Vdd.

The voltage value of the constant voltage source Vdd is set to a bias voltage, which is necessary and sufficient to operate the transistor Tr5 in the pinch off region. The gate voltage of transistor Tr5 is determined by the value obtained by dividing the voltage, supplied from the variable voltage source Vat, with capacitor Cs and the reference capacitor Cr in a capacitive manner such that capacitive change of the capacitor Cs can be detected as the change of the mutual conductance of the transistor Tr5, namely, the change of drain current.

Figure 10:
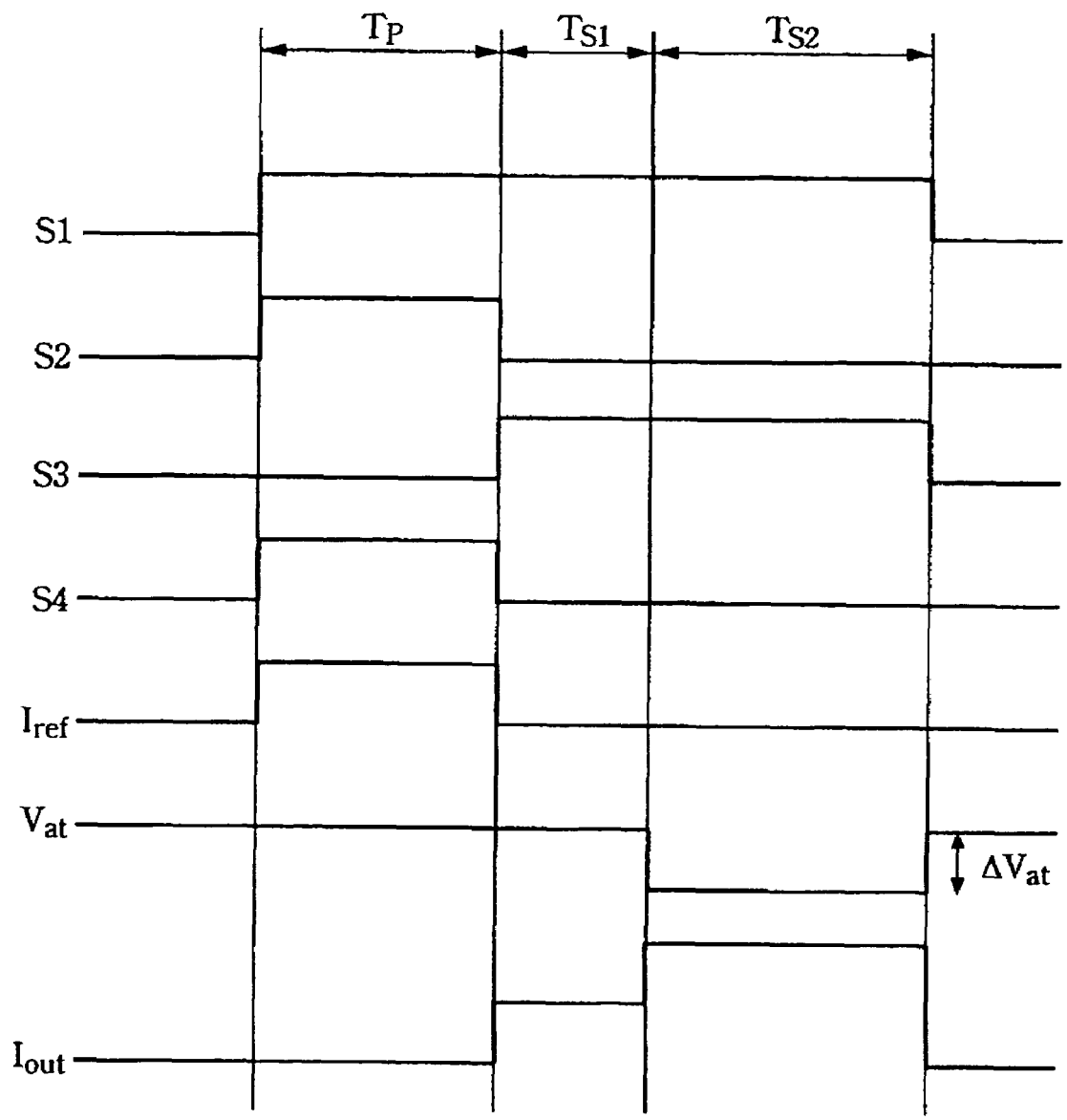
FIG. 10 is a timing chart of various control signals of a sensor cell of the second exemplary embodiment.
Figure 11:
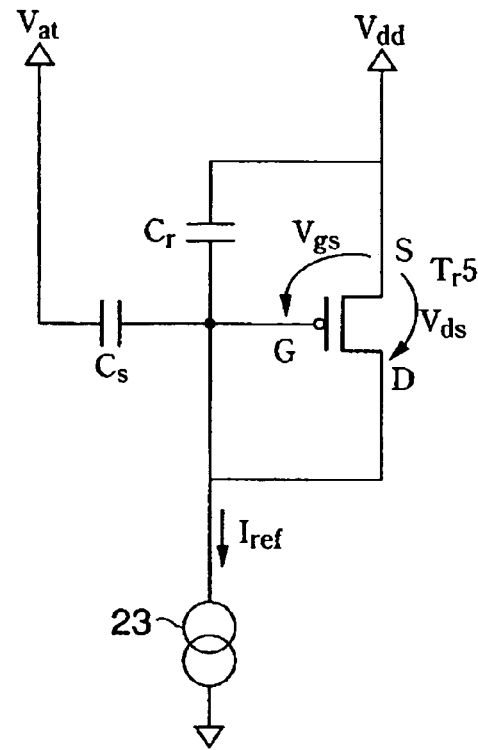
FIG. 11 is an equivalent circuit of the sensor cell.

FIG. 10 is a timing chart of various signals to drive a sensor cell. Serial steps to detect biochemical reaction in the sensor cell 10 includes a compensating stage Tp to compensate characteristics of the transistor Tr5 such as threshold and others, a pre-sensing stage Ts1 for preparation before sensing, and a sensing stage Ts2 to detect capacitive change of the capacitor Cs caused by biochemical reaction as current change. In a compensation stage Tp, the signal of sub scanning line S3 is set to L level, while the signals of the sub scanning lines S1, S2, and S4 are raised to H level. Hence, the switching transistor Tr3, is turned to an "OFF" state, the switching transistors Tr1, Tr2 and Tr4 are turned to an "ON" state. In addition, in this stage, the constant current supply 23 supplies the reference current I ref to the sensor cell 10. An equivalent circuit in the sensor cell 10 at this time is shown in FIG. 11. In this figure, the transistor Tr5 is turned to the "ON" state, the voltage corresponding to the reference current I ref is memorized in the capacitor Cr and the capacitor Cs. In this state, voltage Vgs between a gate and a source is equivalent to voltage Vds between a drain and a source. If the voltage stored in the reference capacitor Cr is Vgs, the voltage stored by capacitor Cs, becomes Vat−Vdd+Vgs.

Next, a stage is shifted to the pre sensing stage Ts1 successively. In this stage, the signal of the sub scanning line S1 is maintained to H level while the signals of the sub scanning lines S2, and S4 are taken down from H level to L level, and the signal of the sub scanning line S3 is raised from L level to H level. Thus, the switching transistor Tr3 is turned from the "ON" state to "OFF" state, while the switching transistors Tr2 and Tr4 are turned from an "ON" state to an "OFF" state. In addition, in this stage, the reference current $I_{ref}$ from the constant current supply 23 to the sensor cell 10 is stopped at 0, the output voltage of the variable voltage source Vat is maintained as constant.

Figure 12:
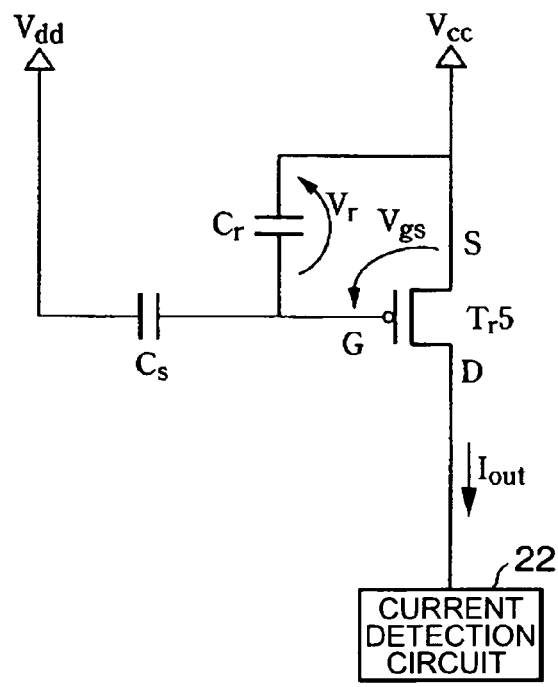
FIG. 12 is an equivalent circuit of the sensor cell.

An equivalent circuit in the sensor cell 10 at this time is shown in FIG. 12. In this figure, in the compensation stage Tp, the voltage stored in the reference capacitor Cr and the capacitor Cs is applied to the gate terminal of the transistor Tr5 and Vgs is biased to negative, such that the transistor Tr5 is turned "ON" state and drain current is outputted from this transistor. In this case, the value of drain current of this is approximately equal to the reference current I ref. Therefore, the value of the output current I out obtained in the pre sensing period Ts1, is equal to the reference current I ref and a constant value, which does not depend upon the value of the capacitor Cs.

Next, a stage is shifted to the sensing stage Ts2 successively. While the voltage of the variable voltage source Vat is changed by ΔVat, the "ON and "OFF" states of each of signals outputted to the sub scanning lines S1 to S4 are maintained without change. When the voltage of the variable voltage source Vat is changed by ΔVat, the gate potential of the transistor Tr5 is changed by capacitive coupling. In this case, the value of the output current I out is equal to a value obtained by the equation (3). Therefore, if the value of the reference current I ref is compared with the output current I out, DNA hybridization can be detected. Furthermore, if the value of β is obtained from the value of the equation (3), the value of Cs can be obtained from the value of β since β=Cs/(Cs+Cr+Cg). Hence, even if the value of the capacitor Cs is microscopic, the value of ΔVat is adjusted to the appropriate value such that the gain of the output current I out can be adjusted in an appropriate range, such that sensing with high precision can be attained.

In addition, the pre sensing stage Ts1 is not always required and a stage may be shifted to the sensing stage Ts2 from the compensation stage Tp promptly.

A Third Exemplary Embodiment of the Present Invention

Figure 13:
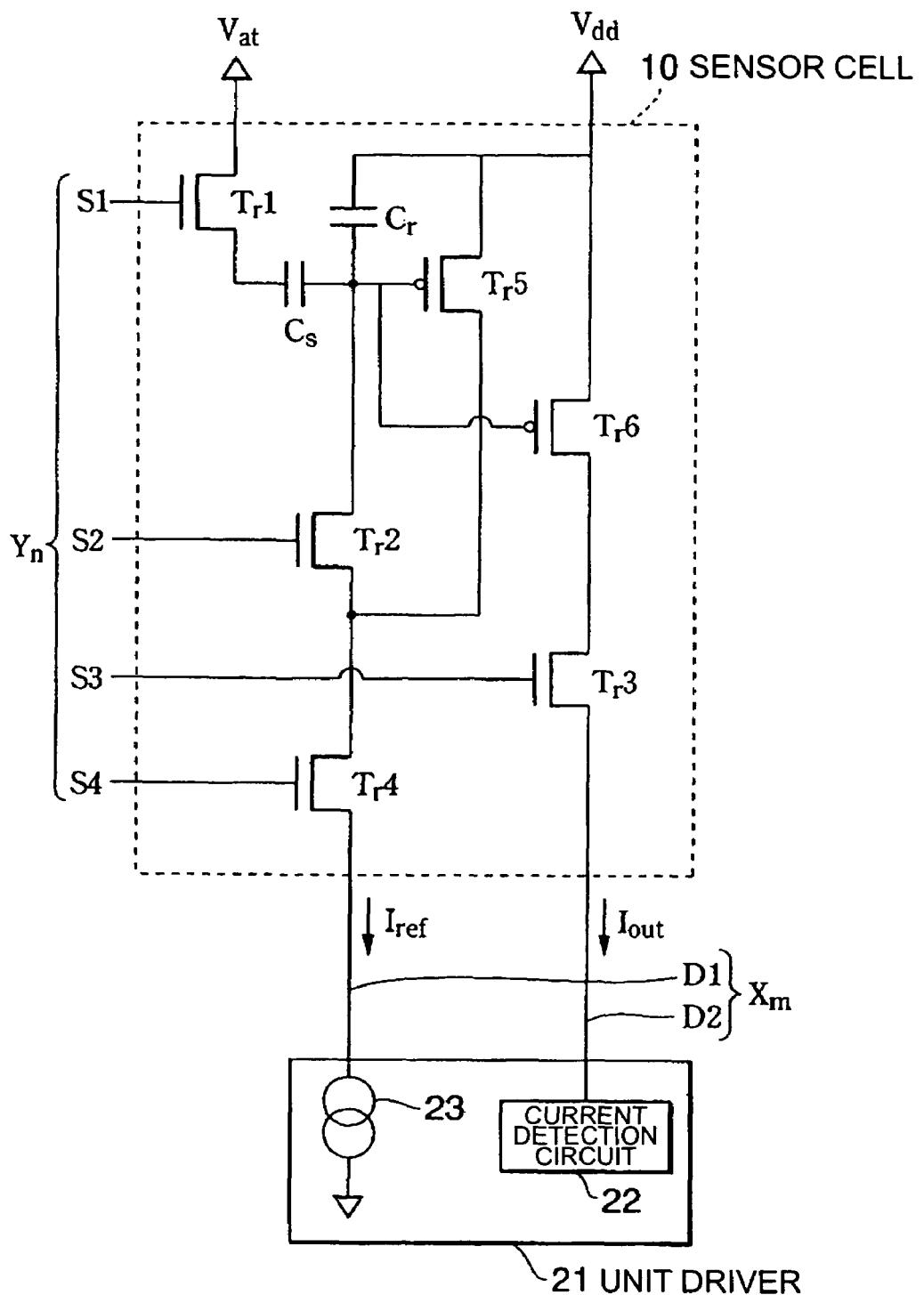
FIG. 13 is a circuit schematic of a sensor cell of the third exemplary embodiment.

FIG. 13 is a figure of circuit structure of the sensor cell 10 of the third exemplary embodiment. In this figure, gate electrodes and/or source electrodes of the transistor Tr5 and Tr6 are connected to each other so as to include a current mirror circuit. In the current mirror circuit, current ratio flowing in a pair of transistors including a mirror, is equivalent to the gain coefficient. Thus, when the device parameters, such as channel-lengths, channel widths, gate oxide film capacity and others of the transistors Tr5 and Tr6 are designed appropriately, current ratio of both transistors can be k:1. In this figure, operation of the switching transistors Tr1 to Tr4, the capacitor Cs and the reference capacitor Cr is the same as the second exemplary embodiment, and detailed description is omitted. In addition, the transistors Tr5 and Tr6 are p channel-type FETs. In this structure, the equivalent circuit of the sensor cell 10 in the compensation stage Tp, is the same shown in FIG. 11. The equivalent circuit of the sensor cells 10 in the pre sensing stage Ts1 and the sensing stage Ts 2, is the same shown in FIG. 12 (But in the present exemplary embodiment, the transistor Tr5 shown in FIG. 12 is replaced with the transistor Tr6). Here, if the gain coefficient of the transistors Tr5 and Tr6 is set to be k>1, electric charge can be accumulated with high-speed in the reference capacitor Cr by the transistor Tr5 during the compensation period, enabling the compensation period shortened. Namely, it is possible to attain highly precise sensing with high speed. On the other hand, if it is k<1 adversely, the value of the output current I out outputted from the transistor Tr6 can be amplified, such that it is possible to detect the capacitor Cs with high sensitivity.

A Fourth Exemplary Embodiment of the Present Invention

Figure 14:
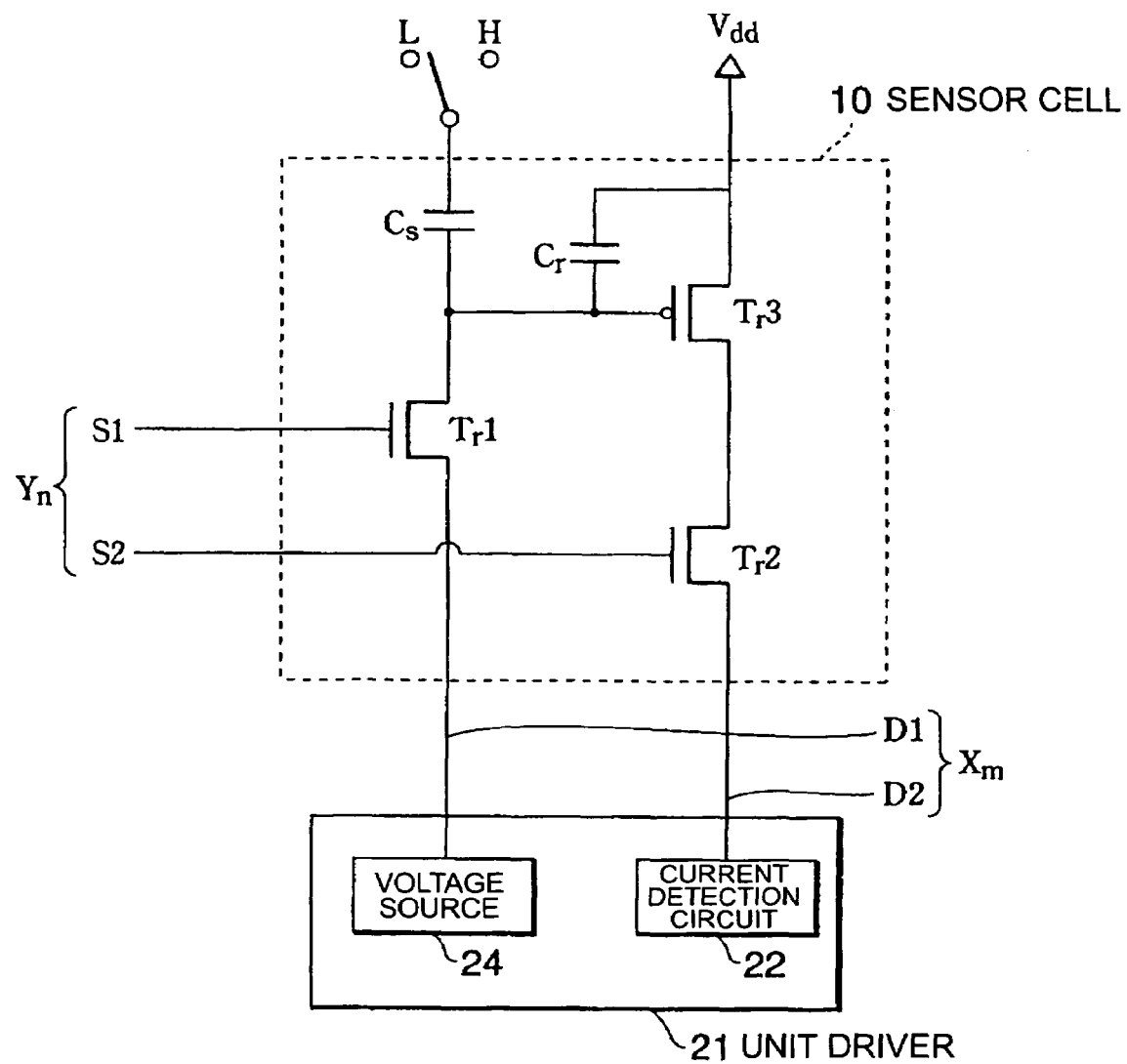
FIG. 14 is a circuit schematic of a sensor cell of the fourth exemplary embodiment.

Exemplary embodiments where fluctuation of characteristics of a transistor is compensated have been described so far. However, in case of measurement where fluctuation of characteristics of a transistor can be ignored or sufficiently small, a circuit shown in FIG. 14 can be used. Details are explained hereafter.

The sensor cell 10 includes the switching transistors Tr1 and Tr2, the transistor Tr3 for sensing, the capacitor Cs of which capacitance is changed caused by DNA hybridization and the reference capacitor Cr having a constant capacitance value. On the other hand, the unit driver 21 includes the current detecting circuit 22 and a voltage source 24. The source terminal of a transistor Tr3 receives voltage, which is necessary and sufficient for the transistor to operate in the pinch off region, from the constant voltage source Vdd.

The reference capacitor Cr is located between the gate terminal and the source terminal of the transistor Tr3. However, the reference capacitor Cr is not always required in case when MOS capacitance of the transistor Tr3 has a sufficient/large volume. It is possible to switch connection of one electrode of the capacitor Cs to one of a plural output terminals, namely, either the low voltage output terminal L or the high voltage output terminal H, and the other electrode is connected to the gate terminal of the transistor Tr3 and the drain terminal of the transistor Tr1. The switching transistor Tr1 is a switching element to write voltage signals from the voltage source 24 to each of the capacitor Cs and the reference capacitor Cr. The switching transistor Tr2 is a switching element for outputting output current of the transistor Tr3 to the current detecting circuit 22.

Figure 15:
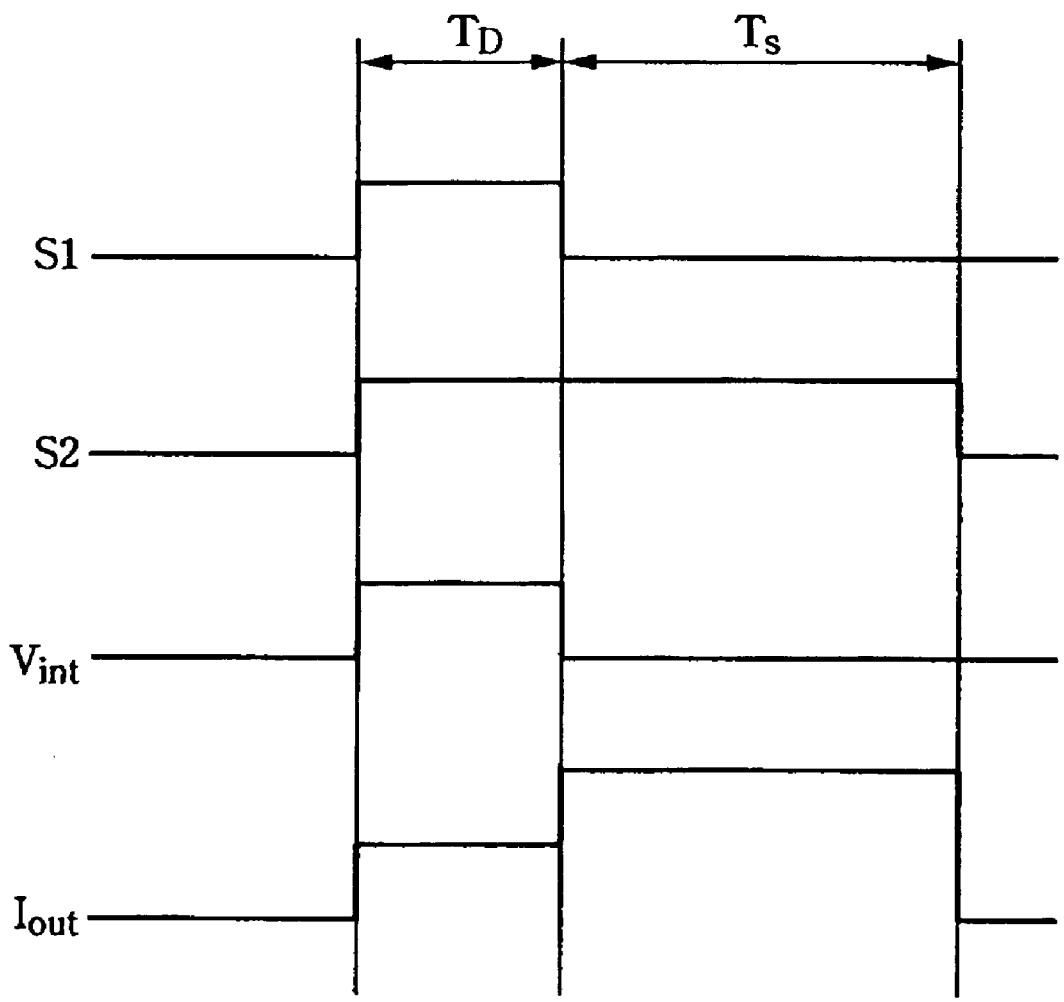
FIG. 15 is a timing chart of various control signals of a sensor cell of the fourth exemplary embodiment.

FIG. 15 is a timing chart of various signals to drive the sensor cell 10. In this figure, TD is a signal writing stage to write a predetermined signal in the reference capacitor Cr and the capacitor Cs. Ts is a sensing stage to detect capacity of the capacitor Cs. In the signal writing stage TD, the signals in the sub scanning lines S1, and S2 are raised to H level, while the capacitor Cs is connected to the high voltage output terminal H and the output voltage $V_{int}$ from the voltage source 24 is applied to the capacitor Cs and the reference capacitor Cr. Hence, a predetermined voltage is written to the reference capacitor Cr and the capacitor Cs. Drain current corresponding to gate potential is outputted to the channel of the transistor Tr3 thereby.

Next, a stage is shifted to the sensing stage Ts successively, the signal in the sub scanning line S1 is taken down from H level to L level so as to turn the transistor Tr1 "OFF" while output of the voltage source 24 is stopped. Furthermore, the gate potential of the transistor Tr3 is taken down by connecting the capacitor Cs to the low output terminal L. The amount of change $\Delta Vgs$ of the gate potential at this time can be expressed by capacitive division as in the following; if a voltage difference between the high voltage output terminal H and the low voltage output terminal L is $\Delta Vdif$ and MOS capacitive amount of the transistor Tr3 is ignored;

$$\Delta Vgs = Cs \Delta Vdif/(Cs+Cr) \quad (4)$$

When the transistor Tr3 works within the pinch off region, drain current and gate potential have the relationship of one-to-one, the output current of the transistor Tr3 is measured so as to obtain the capacitive value of the capacitor Cs by the equation (4). Thus, according to the present exemplary embodiment, gate potential of a transistor is adjusted by capacitive coupling, enabling detection sensitivity of a sensor to be enhanced such that a circuit structure can be simplified and a bio chip can be manufactured with a low cost.

Figure 16:
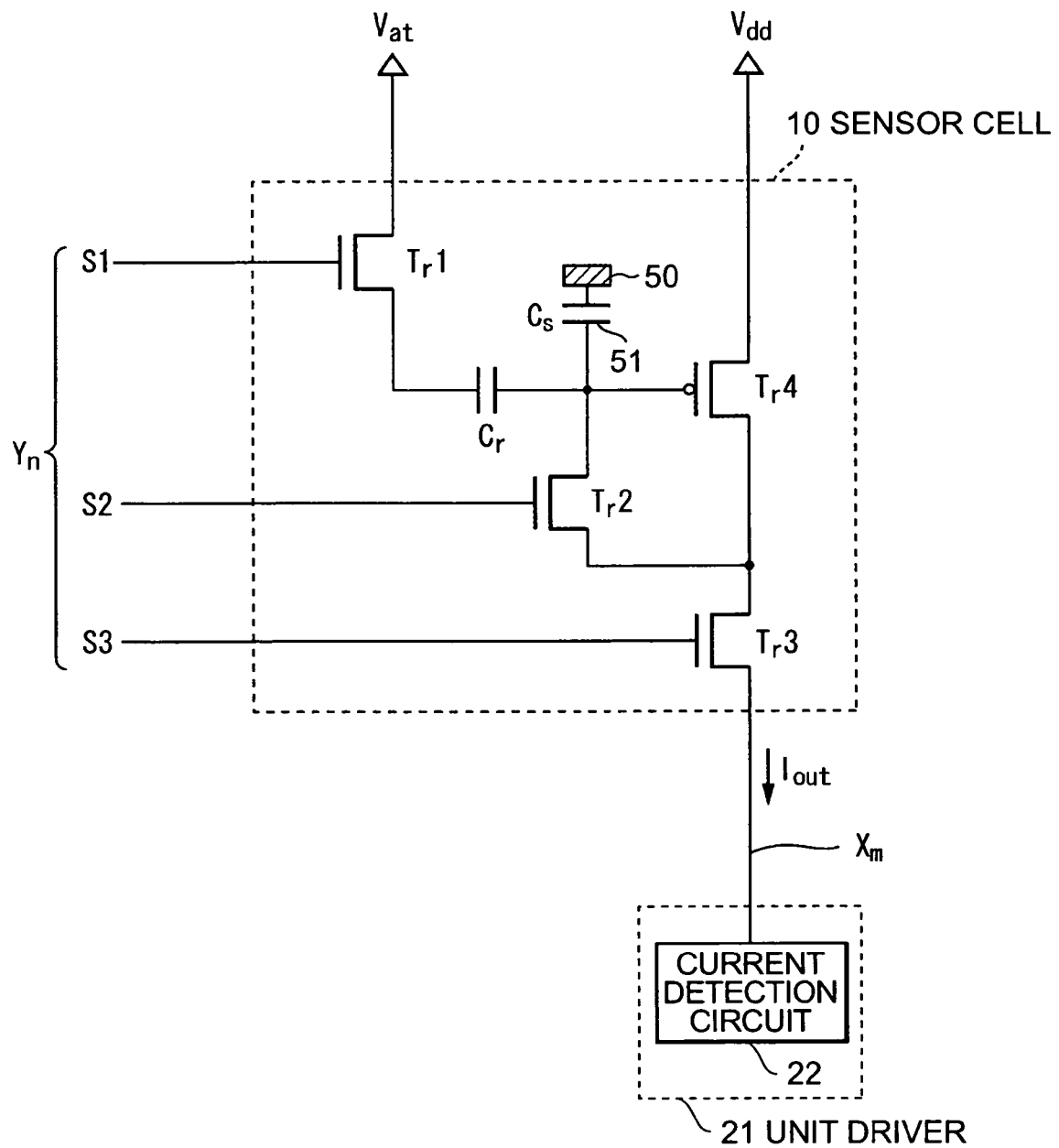
FIG. 16 is a circuit schematic of a sensor cell of the second exemplary embodiment.

In the above exemplary embodiment, the above capacitive element and the capacitor may be composed of a piezo electric element. In this case, for example, a piezoelectric thin film may be interposed between two electrodes including a capacity element. If a piezo electric element is used, the present exemplary embodiment can be utilized as a device to recognize a configuration of a substance, finger-print or others for example. In the above exemplary embodiment, the connection relationship between the reference capacitor Cr and the capacitive element for measuring Cs may be reversed. In other words, the current gain may be adjusted via the reference capacitor Cr. Furthermore, as indicated in FIG. 16, the capacitive element to measure Cs may be interposed between a substance to be examined 50 and an electrode to detect capacity 51. For example, in case of using it as finger print recognition, the substance to be examined 50 is a fingertip. In this case, the gain of current may be adjusted via the reference capacitor Cr. According to the present invention, the gain of output current level can be adjusted based on the amount of voltage variation of variable voltage source such that minute amounts of biochemical reaction can be detected with high precision. In other words, variable voltage is adjusted to desired voltage so as to set the detection sensitivity of the sensor to be an appropriate range, enabling the sensitivity to be adjusted. In addition, according to the present invention, fluctuation of threshold of a FET can be compensated, enabling sensing with high precision to be realized every sensor cell.

What is claimed is:

1. A method of driving an electronic circuit including a transistor and a first capacitive element, comprising;
    electrically connecting a first terminal of the transistor to a current control terminal of the transistor;
    disconnecting an electrical connection between the first terminal and the current control terminal; and
    changing a voltage applied to the current control terminal by supplying a voltage signal to the first capacitive element.

2. The method of driving an electronic circuit claimed in claim 1,
    the voltage signal being output by a voltage supplying unit, and
    a value of the voltage signal being adjusted so as to adjust a gain of a current level or an amount of a current flowing between the first terminal and a second terminal of the transistor.

3. The method of driving the electronic circuit claimed in claim 1,
    a voltage value of the current control terminal being changed by the voltage signal supplied to the first capacitive element.

4. The method of driving the electronic circuit claimed in claim 3,
    the first capacitive element including an acceptor to hold a substance.

5. The method of driving the electronic circuit claimed in claim 4,
    the substance being a protein or a nucleic acid.

6. The method of driving the electronic circuit claimed in claim 3,
    the first capacitive element including an electrode connected to the current control terminal of the transistor.

7. A method of driving an electronic circuit that detects a capacitance generated between a sample and at least one electrode, the method comprising;
    compensating at least one characteristics of a transistor whose gate changes according to the capacitance, the compensating of the at least one characteristic including by electrically connecting the gate and a drain of the transistor; and
    measuring a current whose current level depends on a gate voltage of the gate of the transistor and that flows through the transistor.

8. The method of driving the electronic circuit claimed in claim 7,
    the voltage value of the gate voltage being set by a capacitive coupling via a first capacitive element including the sample and the at least one electrode.

9. The method of driving the electronic circuit claimed in claim 7,
the voltage value of the gate voltage being set by a capacitive coupling via a second capacitive element, including two electrodes and a dielectric material disposed between the two electrodes.

10. A method of driving an electronic circuit that includes a first transistor having a first gate and a first drain and a second transistor having a second gate and a second drain and that detects a capacitance generated between a sample and at least one electrode for detecting a capacitance, the method comprising;
compensating at least one characteristics of the second transistor by using the first transistor in a state in which the first gate is connected to the first drain; and
measuring a current whose current level depends on a gate voltage of the second gate of the second transistor and that flows through the transistor.

11. The method of driving the electronic circuit claimed in claim 10,
a voltage value of the second gate being set by a capacitive coupling via a first capacitive element including two electrodes and a dielectric material disposed between the two electrodes.

12. The method of driving the electronic circuit claimed in claim 10,
a voltage value of the second gate being set by a capacitive coupling via a second capacitive element that includes the sample and an electrode of the at least one of the electrode.

13. A method of driving an electronic circuit detecting a capacitance generated between a sample and at least one electrode, the method comprising;
measuring a current whose level depends on a gate voltage of a gate of a transistor; and
adjusting the gate voltage by a capacitance coupling via a capacitive element.

14. The method according to claim 13,
the capacitive element including the sample and an electrode of the at least one electrode.

15. A method of driving an electronic device that includes a first transistor and a capacitive element, the method comprising;
compensating fluctuation of at least one characteristics of the first transistor; and
measuring an amount of current that flows between a first source and a first drain of the first transistor.

16. The method of driving the electronic device claimed in claim 15,
the compensating of fluctuation being carried out in a state where the first drain is electrically connected to the first gate of the first transistor.

17. The method of driving the electronic device claimed in claim 15,
the compensating of fluctuation being carried in a state where a second drain of a second transistor included in the electronic device is electrically connected to a second gate of the second transistor.

18. The method of driving the electronic device claimed in claim 15, further comprising:
changing a voltage level of a gate of the first transistor from a first voltage level to a second voltage level, the changing of the voltage level including supplying a voltage signal to a capacitive element.

19. A method of driving an electronic equipment, that includes a first capacitive element including a first electrode is connected to a first gate of a first transistor and a second electrode is connected to a voltage supply unit, the method comprising:
measuring an amount of a current that passes through the first transistor, a voltage level of an output voltage outputted from the voltage supply unit being changed during a period in which the measuring of the amount of the current or before the period.

20. The method of driving the electronic device claimed in claim 19,
the measuring of the amount of the current being carried out for each of a plurality of output voltages outputted by the voltage supply unit.

21. An electronic device, comprising:
a transistor that has a gate connected to at least one electrode;
a current detection circuit that measures a current that passes through the transistor; and
a compensation unit that compensates fluctuation of at least one characteristics of the transistor.

22. An electronic device, comprising:
a transistor that has a gate connected to at least one electrode;
a current detection circuit that measures a current that passes through the transistor; and
a voltage signal supply unit that outputs a voltage signal, a voltage level at the gate being adjusted by a capacitance coupling via a capacitive element that receives the voltage signal.

23. The electronic device claimed in claimed in claim 21, further comprising:
a voltage signal supply unit that outputs a voltage signal, a voltage level at the gate being adjusted by a capacitance coupling via a capacitive element that receives the voltage signal.

24. The electronic device claimed in claim 22, further comprising:
a compensation unit that compensates fluctuation of at least one characteristics of the transistor.

25. The method according to claim 7,
the current level of the current depending on the capacitance.

26. The method according to claim 13,
the capacitive element being connected to the gate.

27. The method according to claim 13,
the capacitive element including two electrodes and a dielectric material disposed between the two electrodes.

28. The method according to claim 27,
the capacitance coupling being carried out by changing a voltage level applied to one of the two electrodes.

29. The method according to claim 18,
the changing of the voltage level being carried out during a period in which the measuring of the amount of the current is carried out or before the period.

30. The method according to claim 18,
the capacitive element being connected to a first gate of the first transistor.

31. The electronic device according to claim 23,
the at least one electrode being included in the capacitive element in order to adjust voltage at the current control terminal via the capacitive element.

* * * * *